United States Patent
Ferrel et al.

(10) Patent No.: US 9,340,114 B2
(45) Date of Patent: May 17, 2016

(54) ELECTRIC VEHICLE WITH TRANSIENT CURRENT MANAGEMENT FOR DC-DC CONVERTER

(75) Inventors: Mark J. Ferrel, Brighton, MI (US); Matthew Roger DeDona, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 891 days.

(21) Appl. No.: 13/355,694

(22) Filed: Jan. 23, 2012

(65) Prior Publication Data
US 2013/0187446 A1    Jul. 25, 2013

(51) Int. Cl.
*B60L 11/14* (2006.01)

(52) U.S. Cl.
CPC ............. *B60L 11/14* (2013.01); *B60L 2210/12* (2013.01); *B60L 2240/525* (2013.01); *Y02T 10/70* (2013.01); *Y02T 10/7077* (2013.01); *Y02T 10/7233* (2013.01)

(58) Field of Classification Search
CPC ....... B60W 10/04; B60W 20/00; B60L 1/003; B60L 2210/10
USPC .......................................... 307/9.1, 10.1, 117
See application file for complete search history.

(56) References Cited

U.S. PATENT DOCUMENTS

| | | | |
|---|---|---|---|
| 4,125,895 A | 11/1978 | Buhlmann | |
| 5,179,508 A | 1/1993 | Lange et al. | |
| 5,477,091 A | 12/1995 | Fiorina et al. | |
| 5,717,310 A * | 2/1998 | Sakai et al. | 307/10.1 |
| 5,808,448 A * | 9/1998 | Naito | 322/13 |
| 5,977,652 A * | 11/1999 | Frey et al. | 307/10.1 |
| 6,250,419 B1 | 6/2001 | Chabaan et al. | |
| 6,263,267 B1 | 7/2001 | Anthony et al. | |
| 6,293,366 B1 | 9/2001 | Chabaan et al. | |
| 6,332,506 B1 * | 12/2001 | Kifuku | 180/443 |
| 6,425,454 B1 | 7/2002 | Chabaan et al. | |
| 6,450,275 B1 | 9/2002 | Gabriel et al. | |

(Continued)

FOREIGN PATENT DOCUMENTS

CN    101558544 A    10/2009

OTHER PUBLICATIONS

Chinese Patent and Trademark Office, First Chinese Office Action for the corresponding Chinese Patent Application No. 201310021843.5, posting date Feb. 19, 2016.

*Primary Examiner* — Thienvu Tran
*Assistant Examiner* — David M Stables
(74) *Attorney, Agent, or Firm* — David B. Kelley; Brooks Kushman P.C.

(57) ABSTRACT

An electric or hybrid electric vehicle includes a battery coupled to a traction motor and a DC-DC power converter for managing transient current demands of vehicle accessories such as an electrical power assisted steering (EPAS) motor or antilock braking system (ABS) with a controller coupled to the power converter that generates a first duty cycle signal to supply current at a first level for a first time period to accommodate transient current for an EPAS, ABS, or other short duration event, and a second duty cycle signal that limits the current to a second level lower than the first level for a second time period upon expiry of the first time period to manage temperature of the converter. The controller may also generate a duty cycle signal based on measured or estimated transistor temperature of the DC-DC converter to lower the current limit when transistor temperature exceeds a threshold.

20 Claims, 3 Drawing Sheets

(56) References Cited

U.S. PATENT DOCUMENTS

| | | |
|---|---|---|
| 6,651,771 B2 | 11/2003 | Chabaan |
| 6,661,109 B2 * | 12/2003 | Fukasaku et al. ............ 290/40 C |
| 6,724,100 B1 | 4/2004 | Gabriel |
| 6,742,620 B2 | 6/2004 | Eidam et al. |
| 6,896,094 B2 | 5/2005 | Chabaan |
| 6,959,777 B2 | 11/2005 | Beckerman et al. |
| 7,014,001 B2 | 3/2006 | Beckerman et al. |
| 7,038,427 B2 | 5/2006 | Kok et al. |
| 7,154,068 B2 | 12/2006 | Zhu et al. |
| 7,199,551 B2 | 4/2007 | Gauthier et al. |
| 7,242,169 B2 | 7/2007 | Kanamori et al. |
| 7,258,183 B2 | 8/2007 | Leonardi et al. |
| 7,447,924 B2 | 11/2008 | May |
| 7,798,282 B2 | 9/2010 | Crossman |
| 7,808,214 B2 | 10/2010 | Bartilson |
| 8,004,267 B2 | 8/2011 | Chen et al. |
| 8,344,699 B2 | 1/2013 | Oyobe et al. |
| 2002/0167291 A1 * | 11/2002 | Imai ............ H02J 7/0018 320/119 |
| 2003/0029654 A1 * | 2/2003 | Shimane ............ B60K 6/28 180/65.29 |
| 2003/0144773 A1 * | 7/2003 | Sumitomo ............ 701/22 |
| 2004/0234825 A1 | 11/2004 | Numao et al. |
| 2005/0167090 A1 | 8/2005 | Kennedy |
| 2006/0126269 A1 * | 6/2006 | Kawaguchi et al. ............ 361/502 |
| 2006/0176098 A1 * | 8/2006 | Chen et al. ............ 327/341 |
| 2007/0012505 A1 * | 1/2007 | Walter ............ H02P 25/22 180/444 |
| 2007/0140670 A1 | 6/2007 | DeDona et al. |
| 2007/0178336 A1 | 8/2007 | Xu et al. |
| 2009/0052213 A1 | 2/2009 | Chen et al. |
| 2009/0244944 A1 * | 10/2009 | Jang ............ H02J 7/345 363/126 |
| 2010/0079127 A1 * | 4/2010 | Grant ............ 323/285 |
| 2010/0106351 A1 * | 4/2010 | Hanssen et al. ............ 701/22 |
| 2010/0123441 A1 | 5/2010 | Kim et al. |
| 2010/0164454 A1 * | 7/2010 | Rinne et al. ............ 323/282 |
| 2010/0177543 A1 | 7/2010 | DeDona et al. |
| 2010/0194553 A1 * | 8/2010 | Mizutani et al. ............ 340/438 |
| 2010/0207587 A1 * | 8/2010 | Oyobe ............ H01M 10/613 320/152 |
| 2010/0209792 A1 * | 8/2010 | Umayahara ............ B60L 3/0046 429/429 |
| 2010/0219007 A1 * | 9/2010 | Dalum ............ B60W 30/1888 180/65.22 |
| 2010/0237927 A1 * | 9/2010 | Martin ............ 327/378 |
| 2010/0244459 A1 | 9/2010 | Gibson et al. |
| 2010/0292046 A1 * | 11/2010 | Kaltenbach ............ B60W 30/19 477/3 |
| 2010/0323844 A1 * | 12/2010 | Okubo et al. ............ 477/3 |
| 2010/0327837 A1 * | 12/2010 | Tsugawa ............ H02M 1/32 323/285 |
| 2011/0046828 A1 | 2/2011 | Chander et al. |
| 2011/0082607 A1 | 4/2011 | Chorian et al. |
| 2011/0163699 A1 | 7/2011 | Elder et al. |
| 2011/0300733 A1 | 12/2011 | Janarthanam et al. |

* cited by examiner

ELECTRIC VEHICLE WITH TRANSIENT CURRENT MANAGEMENT FOR DC-DC CONVERTER

TECHNICAL FIELD

The present invention relates to transient current management in a hybrid electric vehicle having a DC-DC converter.

BACKGROUND

Many electric vehicles and hybrid electric vehicles, such as series, parallel, and parallel-series hybrids, typically include a high voltage bus and a low voltage bus to distribute electrical power. Typically, the high voltage bus transfers energy between components used to drive the vehicle and the low voltage bus transfers energy to various types of vehicle accessories.

The high voltage bus can be electrically coupled to the low voltage bus by a direct current to direct current (DC-DC) converter, allowing energy to be transferred between the buses. A DC-DC converter receives an input DC voltage with a corresponding input DC current from a power supply and generates an output DC voltage with a corresponding output DC current for use by a load. In a DC-DC boost converter, the output DC voltage is greater than the input DC voltage. As such, conservation of power requires that the output DC current is less than the input DC current. Conversely, in a DC-DC buck converter, the output DC voltage is less than the input DC voltage and the output DC current is greater than the input DC current.

Various electrical system components, including those of the DC-DC converter, are designed or sized for a maximum continuous steady-state current that is shared or divided among various accessory loads. Under some transient operating conditions, the combined accessory load may exceed the steady-state operating current. Strategies for accommodating increased transient loading may include load shedding, i.e. temporarily disconnecting one or more accessory loads from the power supply to reduce the total current demand. Alternatively, a larger power supply or an energy storage device such as an ultra-capacitor may be used to accommodate the transient current demands. However, these solutions generally result in added cost, weight, complexity, and/or increased space for packaging.

SUMMARY

In one embodiment, a method for controlling a vehicle having a battery selectively coupled to a traction motor and a DC-DC converter having an output current limited to a maximum current includes controlling a duty cycle of the DC-DC converter to limit output current to a first level below the maximum current for a first period of time when temperature of the DC-DC converter is below a first threshold and the output current exceeds a second level for a second period of time, controlling the duty cycle of the DC-DC converter to limit output current to a second level lower than the first level when the temperature of the DC-DC converter is between the first threshold and a second threshold higher than the first threshold until the temperature of the DC-DC converter is below a third threshold, and controlling the duty cycle of the DC-DC converter to provide substantially zero output current when the temperature of the DC-DC converter exceeds the second threshold until the temperature of the DC-DC converter is below a fourth threshold. The method may also include supplying current to an electric power assisted steering (EPAS) system or an antilock braking system (ABS) during the second period of time.

Various embodiments include a vehicle having a battery coupled to a traction motor and a power converter. A controller coupled to the power converter generates a first duty cycle signal to supply current at a first level for a first time period, and a second duty cycle signal that limits the current to a second level lower than the first level for a second time period upon expiry of the first time period. In one embodiment, the power converter comprises a DC-DC buck converter. The vehicle may also include an electric power assisted steering (EPAS) motor coupled to the power converter, wherein the first time period accommodates operation of the EPAS motor during a steering maneuver. Similarly, the vehicle may include an antilock braking system (ABS) coupled to the power converter, wherein the first time period accommodates operation of the ABS during a braking event. In various embodiments, the first and second time periods are based on thermal characteristics of the power converter. The power converter may include at least one transistor with the first and second time periods determined based on measured or estimated temperature of the at least one transistor.

In various embodiments, the second time period is about one-hundred times longer than the first time period. The controller may also generate a zero duty cycle signal when the temperature of the at least one transistor exceeds a first threshold. In one embodiment, the controller generates a duty cycle signal to limit the current to a third level lower than the second level while the temperature of the at least one transistor is between the first threshold and a second threshold lower than the first threshold. The controller may maintain the duty cycle signal to limit the current to the third level until the temperature of the at least one transistor is less than a third threshold.

In one embodiment, a method for controlling a vehicle having a battery powered traction motor and a power converter coupled to the battery includes generating a duty cycle control signal for the power converter to supply current at a first level for a first time period, and generating a duty cycle control signal that limits the current to a second level lower than the first level for a second time period upon expiry of the first time period. The method may also include generating a duty cycle control signal that limits the current to a third level lower than the second level while converter temperature is between a first threshold and a second threshold. In various embodiments, the second time period is on the order of one-hundred times longer than the first time period. In one embodiment, the method includes performing an antilock braking system (ABS) maneuver during the first time period. The method may include performing an electrical power assisted steering (EPAS) maneuver during the first time period. In one embodiment, the converter includes at least one transistor and the method includes generating a duty cycle control signal for the power converter based on temperature of the at least one transistor. The temperature may be measured, or estimated based on duration and level of current supplied by the power converter.

Various embodiments according to the present disclosure may include one or more advantages. For example, systems and methods according to the present disclosure provide transient current management of a power converter in an electric or hybrid electric vehicle without imposing load shedding to provide sufficient current to accommodate short duration events that may require a current boost, such as an electric power assisted steering (EPAS) or antilock braking (ABS) event.

The above advantages and various other advantages and features associated with the claimed subject matter will be

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
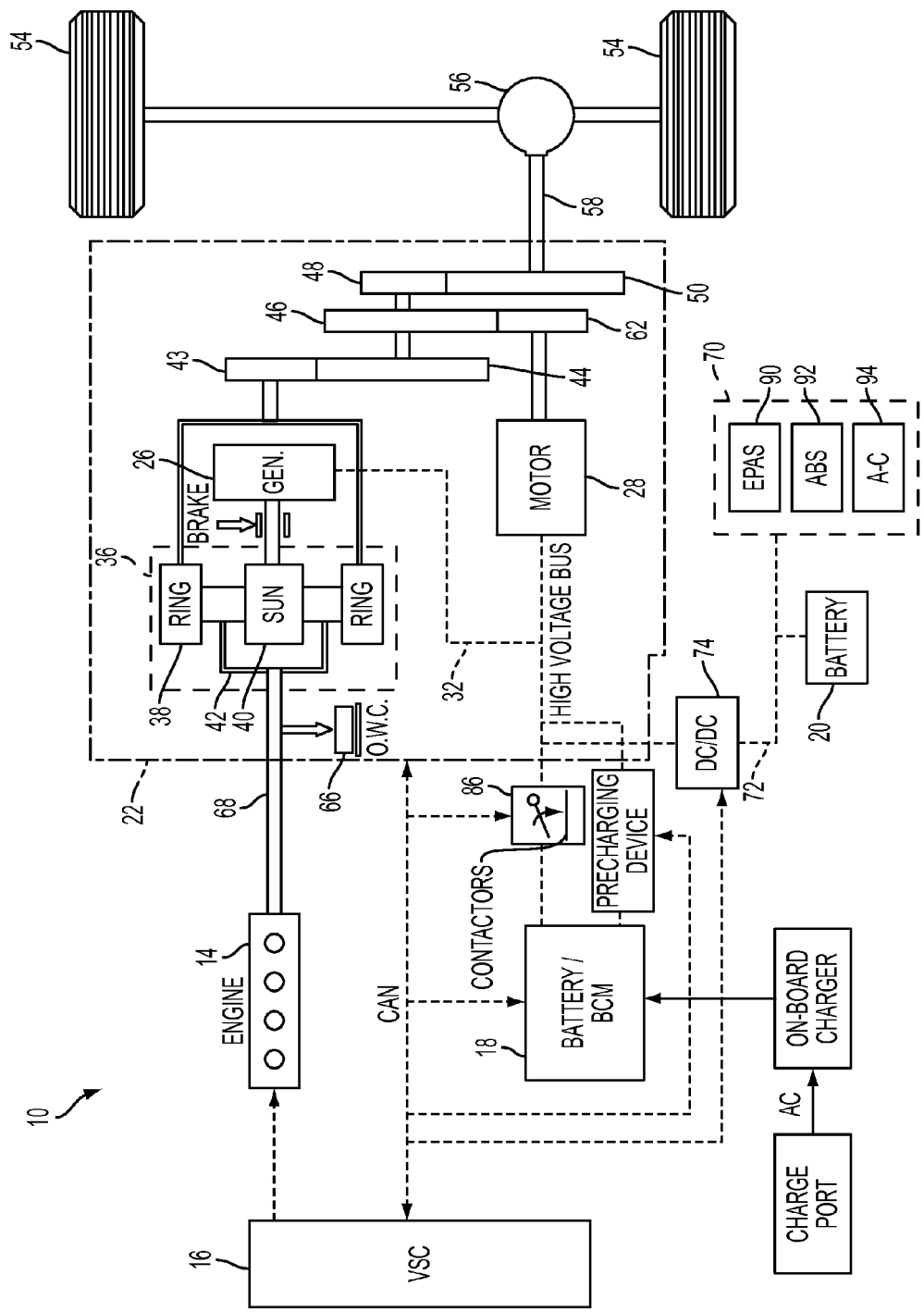
FIG. 1 is a block diagram illustrating operation of a system or method for controlling a power converter for an electric or hybrid electric vehicle according to various embodiments of the present disclosure.

FIG. 1 is a block diagram illustrating operation of a system or method for controlling a power converter for an electric or hybrid electric vehicle according to various embodiments of the present disclosure. While illustrated and described with respect to a parallel-series hybrid vehicle (PSHEV) system 10, also referred to as a power-split configuration, the present invention may also be used with various other types of electric and hybrid electric vehicle (HEV) configurations, such as series hybrid electric vehicles (SHEV), parallel hybrid electric vehicles (PHEV), and fuel cell hybrid vehicles (FCHEV). Similarly, those of ordinary skill in the art will recognize various other applications for a power converter as disclosed and claimed.

In the representative embodiment of an HEV illustrated in FIG. 1, system 10 includes a gasoline-fueled internal combustion engine (ICE) 14, a vehicle system controller (VSC) 16, a high voltage battery 18, and a low voltage battery 20. Various types or configurations for ICE 14 may be used to provide an alternative or secondary power source.

ICE 14 and high voltage battery 18 are coupled to the vehicle driveline through an electronic power transmission 22 having first and second electrical machines 26, 28. Those of ordinary skill in the art will recognize that electrical machines may be operated as a motor or generator. In the embodiment of FIG. 1, first electrical machine or motor/generator 26 functions primarily as a generator and second electrical machine or motor/generator 28 functions primarily as a motor.

A high voltage battery 18 serves primarily as an energy storage device to store electrical energy produced by first motor/generator 26. A high voltage bus 32 couples the first and second motor/generators to the high voltage battery 18. A precharging device may be included in some applications. Where included, the precharging device is controllable by the vehicle system controller 16 and provides energy from battery 18 to high voltage bus 32 for precharging.

ICE 14 may be referred to as a primary power source, and the combination of the high voltage battery 18, motor/generator 26 and motor/generator 28 may be collectively referred to as a secondary power source in some applications. However, it is understood that the primary and secondary sources can be interchanged, and that the invention is not intended to be limited to specific types of vehicular power sources. For example, the primary power source can be implemented by any internal combustion engine, including but not limited to gasoline, diesel, hydrogen, methanol, natural gas, ethanol or other gas or liquid-fueled internal combustion engine. Alternatively, the primary power source can be a fuel cell engine, such as a hydrogen-powered fuel cell engine, for example. Likewise, the secondary power source is not limited to a battery and corresponding electrical machines, but may also include ultracapacitors, linear generators, and other electromechanical or hydraulic devices for generating torque.

Power transmission unit 22 includes a planetary gearset 36, which includes a ring gear 38, a sun gear 40 and a planetary carrier assembly 42. The ring gear 38 couples motor/generator 26 to the vehicle drivetrain via meshing gears 43, 44, 46, 48 and 50. Sun gear 40 and planetary carrier assembly 42 likewise selectively couple the ICE 14 and motor/generator 26, respectively, to the vehicle drivetrain (shown as vehicle traction wheels 54, and differential and axle mechanism 56) via a torque output shaft 58 of the transmission 22.

Gears 44, 46, and 48 are mounted on a countershaft with gear 46 engaging a motor-driven gear 62. Electric motor 28 drives gear 62, which acts as a torque input for the countershaft gearing. VSC 16 may operate HEV system 10 in a number of different power modes utilizing one or more of ICE 14, motor/generator 26, and motor/generator 28, which may include parallel, split and electric, modes, for example, as generally known.

Electric vehicle or EV mode is established when ICE 14 is shut off and a one-way clutch 66 is engaged for braking torque input shaft 68 and carrier assembly 42. This leaves the vehicle in EV mode wherein tractive force is delivered only by an electric propulsion system comprised of high voltage battery 18 and one or both of motor/generator 26 and motor/generator 28. Whether operating in EV mode or various other hybrid operating modes, system 10 can also be used to power accessory loads 70 such as, a radio, CD player, GPS system, lighting, and others, as one of ordinary skill in the art will appreciate. Accessory loads 70 may also include a motor associated with an electrical power assisted steering (EPAS) system 90, solenoids or motors associated with an anti-lock braking system (ABS) 92, and an air conditioning (A-C) compressor 94, for example.

Accessory loads 70 may be powered via energy delivered or distributed over low voltage bus 72. The energy to power accessory loads 70 may be provided by low voltage battery 20, high voltage battery 18 (via high voltage bus 32), and/or motor/generator 26.

A power converter, such as DC/DC converter 74, is provided to control the transfer of energy to the low voltage bus 72 from the high voltage bus 32 with transient current management according to the present disclosure. In this manner, energy from high voltage battery 18, or energy developed during regenerative braking and delivered to the high voltage bus 32, can be transferred though DC/DC converter 74 to low voltage bus 72.

The DC/DC converter 74 is controllable by vehicle system controller 16 or another control module that may communicate with controller 16 over a controller area network (CAN), for example. In general, vehicle system controller 16 monitors various sensors of system 10 and communicates a control signal to the DC/DC converter 74. In one embodiment, VSC 16 generates a control signal for DC/DC power converter 74 to control the duty cycle to supply current at a first level for a first time period and generates a duty cycle control signal that limits the current to a second level lower than the first level for a second time period upon expiry of the first time period to provide transient current management during a steering maneuver using EPAS 90 or a braking event using ABS 92. In response to the control signal, the DC/DC converter 74 controls the transfer of electrical energy between the high voltage bus 32 and the low voltage bus 72.

As illustrated in FIG. 1, battery 18 may be selectively coupled to a traction motor 28 via contactors 86 and a DC-DC converter 74 via high voltage bus 32. VSC 16 may impose a programmable current limit for DC-DC converter 74 by corresponding control of the duty cycle to limit the output current to a maximum current level based on current operating conditions, which may include measured or estimated temperature of DC-DC converter 74, for example. In one embodiment, VSC 16 controls a duty cycle of DC-DC converter 74 to limit output current to a first level below the maximum current for a first period of time when temperature of the DC-DC converter is below a first threshold and the output current exceeds a second level for a second period of time. In addition, VSC 16 controls the duty cycle of DC-DC converter 74 to limit output current to a second level lower than the first level when the temperature of the DC-DC converter 74 is between the first threshold and a second threshold higher than the first threshold until the temperature of the DC-DC converter 74 is below a third threshold, and controls the duty cycle of the DC-DC converter to provide substantially zero output current when the temperature of the DC-DC converter 74 exceeds the second threshold until the temperature of the DC-DC converter 74 is below a fourth threshold.

Figure 2:
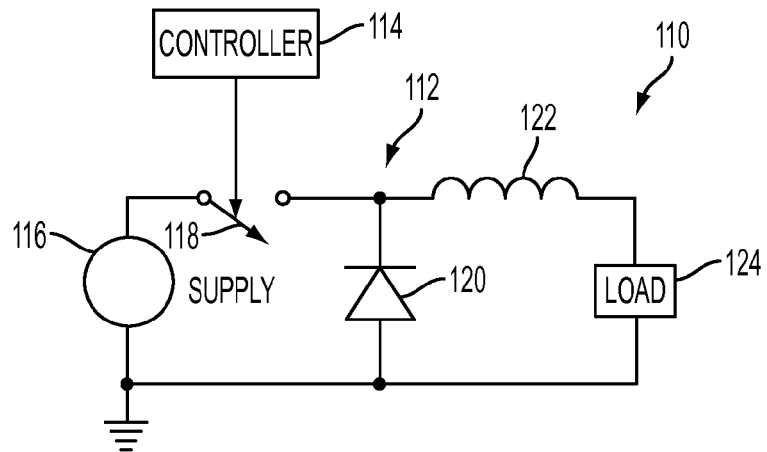
FIG. 2 is a simplified schematic diagram illustrating a DC-DC power converter assembly in accordance with an embodiment of the present invention.

Referring now to FIG. 2, a simplified schematic of a DC-DC converter assembly 110 in accordance with an embodiment of the present invention is shown. Converter assembly 110 includes a DC-DC buck converter 112 and a controller 114. Controller 114 controls buck converter 112 to connect with and disconnect from a DC power supply 116. Power supply 116 may be a battery or the like for supplying an input DC voltage with a corresponding input DC current. In one embodiment, power supply 116 is a high voltage battery, such as battery 18 of an electric or hybrid electric vehicle system 10. In general, based on the rate (i.e., duty cycle) of connecting with and disconnecting from power supply 116 and based on the input DC voltage and the corresponding input DC current, buck converter 112 generates an output DC voltage and a corresponding output DC current for use by a load 124. For vehicle applications, controller 110 may receive a corresponding control command or signal from another controller, such as VSC 16, to limit output current of converter 110 by controlling the duty cycle.

Buck converter 112 includes a first switch 118, a second switch 120, and an inductor 122. In one embodiment, switches 118 and 120 are implemented by semiconductor switches. In one embodiment, first switch 118 is implemented by a transistor and second switch 120 is implemented by a diode.

The input end of buck converter 112 is connectable to power supply 116. In particular, first switch 118 is switchable between an opened position (i.e., "Off state") in which power supply 116 is disconnected from buck converter 112 and a closed position (i.e., "on state") in which power supply 116 is connected to buck converter 112. The output end of buck converter 112 is connected to load 124 with load 124 being connected between the output end of inductor 122 and ground as shown in FIG. 2. Buck converter 112 may further include a capacitor (not shown in FIG. 2) in parallel with load 124 for smoothing of the output voltage.

Controller 114 is operable to control the switching of first switch 118 to alternate between the on and off states. In the on state in which first switch 118 is closed, inductor 122 is connected to power supply 116 and stores energy from power supply 116. In the off state in which first switch 118 is opened, inductor 122 is disconnected from power supply 116 and discharges stored energy into load 124.

The energy (E) stored in inductor 122 is defined by the following equation:

$$E = \tfrac{1}{2} * L * (I_L)^2$$

where L is the inductance of inductor 122 measured in henries and $I_L$ is the current flowing through inductor 122. As such, the greater the inductance L of inductor 122, the more energy which may be transferred from the input to the output of buck converter 112 for a given current flowing through inductor 122. The inductance L of inductor 122 depends on characteristics of inductor 122 such as the number of loops or turns, the size of each loop or turn, and any magnetic characteristics of the core around which the loops are wrapped. With all else being equal, the inductance L of inductor 122 increases with the number of loops or turns.

Buck converter 112 generates an output DC voltage and a corresponding output DC current in relation to the input DC voltage and the input DC current from power supply 116 based on the switching duty cycle. The output DC voltage is less than the input DC voltage from power supply 116 and, as power is conserved, the output DC current is greater than the input DC current from power supply 116. The output DC voltage and the output DC current may be supplied to load 124. For completeness, during steady state, the output DC current is equal to the average value of the current flowing through inductor 122.

The duty cycle of the on-and-off switching for connecting and disconnecting inductor 122 to and from power supply 116 defines the relationship between the input voltage from power supply 116 and the output voltage of buck converter 112. For instance, a duty cycle of 25% results in the output voltage being one quarter of the input voltage. As an example, if the input voltage were forty volts (40V) then the output voltage would be ten volts (10V). Correspondingly, with the duty cycle being 25%, the output current would be four times the input current. In this example, if the input current was one amp (1 A) then the output current would be four amps (4 A).

Power supply 116 may represent the power output of a step-up DC-DC transformer or a plurality of individual power supplies connected in sequence. As such, even though each of one or more individual power supplies may be a 12-volt power supply, the input voltage to buck converter 112 may be on the order of 200-400 volts with a corresponding relatively small input current. In this case, the switching of buck converter 112 may be controlled such that buck converter 112 has an output voltage on the order of 12-15 volts with a corresponding relatively large output current (such as on the order of 165 amps).

Load 124 may represent a single device or a plurality of different devices. Any of the one or more devices represented by load 124 may vary in power requirements from buck converter 112 depending upon current operating conditions.

For vehicle applications, load 124 represents the loads of various vehicle accessories or subsystems as generally represented by auxiliary loads 70 in FIG. 1.

Buck converter 112 is generally designed or sized to output a maximum continuous steady-state DC current based on a corresponding input voltage and current supplied by power supply 116. The maximum continuous steady-state current corresponds to the current that may be continuously supplied to load 124 without damage to converter 112 while operating within specified ambient conditions. The maximum continuous steady-state current output from buck converter 112 that can be delivered to load 124 also depends directly on the inductance L of inductor 122. As such, a higher maximum continuous steady-state current output from buck converter 112 generally requires a larger inductance L of inductor 122.

In general, converter 112 is sized to accommodate anticipated steady-state loads and certain transient operating events for a particular application. However, those of ordinary skill in the art will appreciate that sizing of converter 112 and related components to accommodate all possible loading combinations, regardless of the probability of a particular combination actually occurring, may result in unnecessary costs and weight. For example, accommodating all possible combination loading scenarios for steady state and transient events may require a larger power supply and associated components than what is otherwise necessary for operation under most conditions. As such, various strategies have been developed to manage relatively infrequent loading events, particularly short duration or transient loading events. For example, load shedding selectively disconnects one or more loads so that the resulting power capacity may be used or diverted to selected accessories. For example, in a vehicle application, load shedding may result in the air conditioning compressor being selectively disconnected to provide additional current capacity for accelerating the vehicle. While acceptable for many applications, load shedding may adversely impact vehicle drivability and customer satisfaction in some applications.

In an exemplary hybrid vehicle application, a buck converter having the layout of buck converter 112 is sized to output a maximum continuous steady-state current on the order of 165 amps at an output voltage on the order of 12 volts with use of a power supply providing an input voltage on the order of 200-400 volts and a corresponding input current. As an example, the inductor of such a buck converter has three loops of an appropriate size and an appropriate magnetic core material to provide a specified inductance L. As explained above, this inductor would have a higher inductance L if the inductor had four loops with everything else being equal.

Converter assembly 110 is configured such that buck converter 112 can generate a current boost beyond the maximum continuous steady-state current of the buck converter in the exemplary hybrid vehicle application for a short duration of time to provide additional power from power supply 116 during a transient event. For example, in use with the exemplary hybrid vehicle application in which power supply 116 provides an input voltage on the order of 200-400 volts and a corresponding input current, buck converter 112 can output a current greater than the maximum continuous steady-state current of 165 amps during the short duration of time. That is, during a transient event, buck converter 12 can provide a larger current than the maximum continuous steady-state design current. In one embodiment, buck converter 112 can provide 195 amps during a transient event as compared to the maximum continuous steady-state current of 165 amps. Representative transient events may include an electrical power assisted steering (EPAS) event and/or an anti-lock brake system (ABS) event, for example. Such transient events are normally completed in a time period on the order of milliseconds (for example, 600 mSec).

As such, upon the occurrence of a transient event, controller 114 controls buck converter 112 to generate a boost current (e.g., 195 amps) beyond the normal maximum continuous steady-state current (e.g., 165 amps) for a short duration of time (e.g., 600 mSec). Accordingly, controller 114 controls buck converter 112 to set the transient output current limit of buck converter 112 higher than the maximum continuous steady-state current of 165 amps for up to 600 msec, which allows for the transient event to be fully completed.

To provide such capability, converter assembly 110 has two general features. First, buck converter 112 differs from the buck converter in previous hybrid vehicle applications in that inductor 122 of buck converter 112 is configured to have a relatively higher inductance L. For example, with all else being equal, inductor 122 of buck converter 112 has four loops rather than three loops. This relative minor change provides increased storage inductance to mitigate discontinuous conduction (i.e., avoid saturation) and avoids any thermal issues with the manner in which controller 114 controls the duty cycle of buck converter 112 as described below. Second, controller 114 controls the switching (i.e., the duty cycle) of buck converter 112 to set the maximum transient output current of buck converter 112 higher than the maximum continuous steady-state output current (e.g., 195 amps vs. 165 amps) during a transient event for a short duration of time (e.g., 600 mSec, which is enough time for the transient event to complete) and to then set the output current of buck converter 112 to the maximum continuous steady-state output current limit (e.g., 165 amps) for 59.4 seconds after the 600 mSec time period has expired to manage the thermal effects of the increased current. Subsequently, after the 59.4 second time period has expired, controller 114 controls the duty cycle of buck converter 112 to set the output current of buck converter 112 higher than the maximum continuous steady-state output current to accommodate another transient event.

As described above, controller 114 is operable to control the connection and disconnection between buck converter 112 and power supply 116 (i.e., to control the switching of first switch 118 to connect and disconnect buck converter 112 to power supply 116). Controller 114 is further operable to monitor the output current of buck converter 112, to increment a timer/counter, and to detect or receive a signal indicative of the occurrence of a transient event. As such, controller 114 has various inputs for receiving relevant information for corresponding sensors, actuators and/or other controllers.

Figure 3:
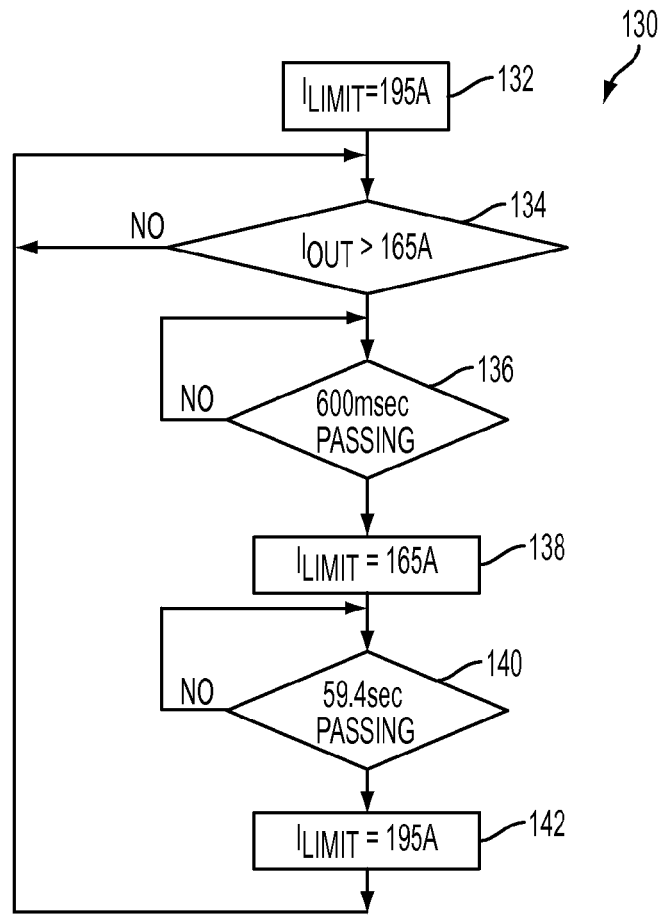
FIG. 3 illustrates a flowchart describing operation of a vehicle with an electrically powered traction motor and a DC-DC power converter assembly according to one embodiment of the present invention.

Referring now to FIG. 3, with continuing reference to FIGS. 1 and 2, a flowchart 130 describing operation of converter assembly 110 is shown. In particular, flowchart 130 describes operation of controller 114 for controlling buck converter 112 by way of controlling the duty cycle of buck converter 112. Initially, controller 114 controls the duty cycle of buck converter 112 to set the limit of the output current of buck converter 112 to a boost current value (e.g., 195 amps) greater than the maximum continuous steady-state current (e.g., 165 amps) as shown in block 132.

As noted, more current than the maximum continuous steady-state current of 165 amps may be needed during some transient operating events, which may include an EPAS steering maneuver or an ABS braking event, for example. As such, the output current of buck converter 112 during a transient event is controlled to deliver a transient current that exceeds the maximum continuous steady-state current limit. In one embodiment, the output current of buck converter 112 during a transient event may be up to the 195 amps boost current limit. With reference to block 134, controller 114 monitors one or more sensors, actuators, and/or other controllers to detect a transient event, which may be indicated by the output current of buck converter 112 exceeding the maximum continuous steady-state current (i.e., whether the output current of buck converter 112 is greater than 165 amps). If the output current of buck converter 112 is greater than the maximum continuous steady-state current limit of 165 amps, then controller 114 controls the duty cycle of buck converter 112 to maintain the boost current limit for a period of 600 mSec as shown in block 136. The 600 mSec duration of time is long enough for a typical transient event as described herein to be completed.

After the predetermined time limit (600 mSec in this example) has expired, controller 114 controls the duty cycle of buck converter 112 to set the limit of the output current of buck converter 112 to the maximum continuous steady-state current of 165 amps as shown in block 138. Controller 114 controls the duty cycle of buck converter 112 to maintain the limit of the output current of buck converter 112 to the maximum continuous steady-state current of 165 amps for a second predetermined period of time (59.4 seconds in this example) as shown in block 140. After the 59.4 second time period has expired, controller 114 controls the duty cycle of buck converter 112 to reset the limit of the output current of buck converter 112 back to the boost current limit of 195 amps as shown in block 142. Thereafter, this operation cycle repeats with buck converter 112 in a ready condition for providing output current greater than the maximum continuous steady-state current of 165 amps to accommodate a subsequent transient event. In general, the first and second time periods are based on thermal characteristics of the power converter. In some embodiments, buck converter 112 includes switches implemented by at least one transistor and the first and second time periods are determined based on measured or estimated temperature of the at least one transistor. As illustrated by the representative embodiment, the second time period may be about one-hundred times longer than the first time period to provide cooling of the converter.

The operation of converter assembly 110 shown in flowchart 130 of FIG. 3 represents a transient boost mode of operation of converter assembly 110. As described with reference to FIG. 4, the operation of converter assembly 110 may also include other operating modes based on thermal management of converter assembly 110. In one embodiment, operating modes or strategies for transient current management of a power converter, such as converter 110, may include a thermal derating mode or strategy and an overheat protection mode or strategy.

Figure 4:
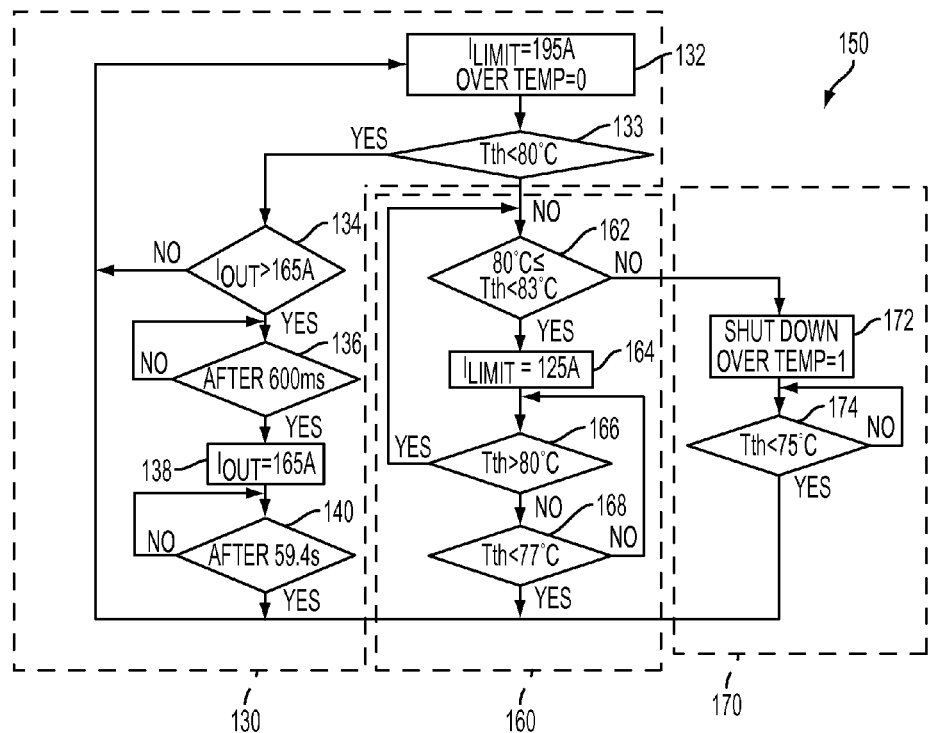
FIG. 4 illustrates a flowchart describing operation of an electric or hybrid electric vehicle with a DC-DC power converter assembly according to one embodiment of the present invention.

Referring now to FIG. 4, with continual reference to FIGS. 1 and 2, a flowchart 150 describing operation of a converter assembly 110 according to one embodiment of the present disclosure is shown. The operation of converter assembly 110 in this embodiment includes a transient boost strategy 130 as described with reference to FIG. 3, in addition to a thermal derating strategy 160, and an overheat protection strategy 170.

The operation of transient boost segment 130 begins in block 132 in which controller 114 controls the duty cycle of buck converter 112 to set the limit of the output current to the boost current value of 195 amps. Further, in block 132, an over_temp flag is set to zero. In block 133, controller 114 compares the temperature of first switch 118 with a first threshold temperature of 80° C. The temperature of first switch 118 may be measured or estimated. In one embodiment, temperature of first switch 118 is provided to controller 114 by a temperature sensor that measures the temperature of first switch 118. If the temperature of first switch 118 is less than 80° C., then the operation of transient boost segment 130 proceeds as shown in FIG. 4 and as described with reference to FIG. 3.

If the temperature of first switch 118 is greater than a first threshold, which is 80° C. in this example, then operation proceeds to thermal derating segment 160. Controller 114 then determines whether the temperature of first switch 118 is between the first threshold temperature of 80° C. and a second threshold temperature of 83° C. as shown in block 162. If this condition is true, then further operation of thermal derating segment 160 proceeds with controller 114 controlling the duty cycle of buck converter 112 to set the limit of the output current to a value lower than the maximum continuous steady-state current of 165 amps as shown in block 164. In particular, controller 114 sets the limit of the output current to 125 amps as shown in block 164. This relatively lower output current limit provides an opportunity for first switch 118 to cool.

Subsequently, controller 114 determines whether the temperature of first switch 118 has cooled such that its temperature is less than the first threshold of 80° C. as shown in block 166. If this comparison is false, meaning that the temperature of first switch 118 is still greater than the first threshold temperature of 80° C., then blocks 162 and 164 of thermal derating segment 160 are repeated. Conversely, if this comparison is true, meaning that the temperature of first switch 118 is now less than the first threshold temperature of 80° C., then operation proceeds to block 168. In block 168, controller 114 determines whether the temperature of first switch 118 has cooled to less than a temperature of 77° C. which is less than the first threshold temperature of 80° C. If yes, then the operation returns to block 132 in which the limit of the output current is set to the boost current limit of 195 amps. If no, then blocks 166 and 168 repeat until block 168 is satisfied.

Returning to block 162 of thermal derating segment 160, if the temperature of first switch 118 is greater than the second threshold temperature of 83° C., then operation proceeds to overheat protection segment 170. At this time, controller 114 controls first switch 118 to disconnect from power supply 116 as shown in block 172. That is, controller 114 shuts down buck converter 112. In one embodiment, controller 114 generates a zero duty cycle signal when the temperature of the converter or at least one transistor of the converter exceeds a first threshold to shut down the buck converter 112. Controller 114 keeps first switch 118 disconnected from power supply 116 until the temperature of first switch 118 is less than a corresponding threshold temperature of 75° C. as shown in block 174. Upon first switch 118 cooling to a temperature lower than the threshold temperature of 75° C., the operation returns to block 132 in which the limit of the output current is set to the boost current limit of 195 amps.

As generally illustrated and described with reference to FIGS. 1-4, a method for controlling a vehicle 10 having a battery 18 selectively coupled to a traction motor 28 and a DC-DC converter 74 having an output current limited to a maximum current includes controlling a duty cycle of the DC-DC converter to limit output current to a first level below the maximum current as shown at 138 for a first period of time as shown at 140 when temperature of the DC-DC converter 74 is below a first threshold as shown at 133 and the output current exceeds a second level as shown at 134 for a second period of time as shown at 136. The method may also include controlling the duty cycle of the DC-DC converter 74 to limit output current to a second level lower than the first level as shown at 164 when the temperature of the DC-DC converter 74 is between the first threshold and a second threshold higher than the first threshold as shown at 162 until the temperature of the DC-DC converter 74 is below a third threshold as shown at 168. The method may also include controlling the duty cycle of the DC-DC converter 74 to provide substantially zero output current when the temperature of the DC-DC converter 74 exceeds the second threshold as shown at 162 until the temperature of the DC-DC converter 74 is below a fourth threshold as shown at 174.

Figure 5:
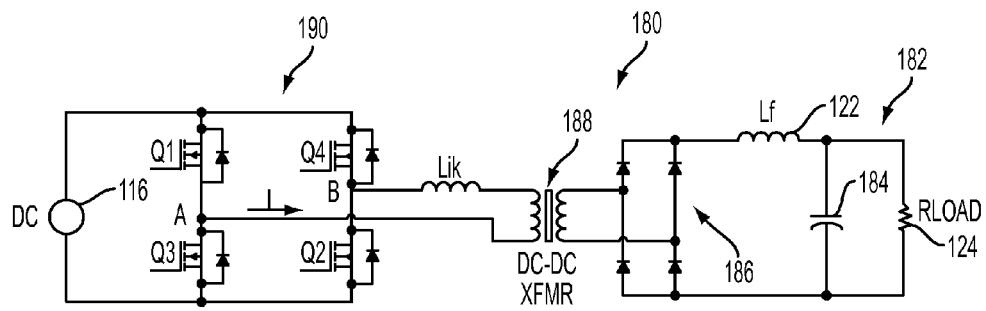
FIG. 5 is a simplified schematic diagram illustration operation of a DC-DC converter assembly in accordance with various embodiments of the present invention.

Referring now to FIG. 5, a DC-DC converter assembly 180 in accordance with another embodiment of the present invention is shown. Converter assembly 180 includes a full-bridge phase-shift resonant buck converter 182. Buck converter 182 is similar to buck converter 112 in that buck converter 182 includes inductor 122 connected to load 124. Buck converter 182 further includes a capacitor 184 connected in parallel to load 124 for output voltage smoothing. In place of diode 120, buck converter 182 includes a full-bridge diode configuration 186 at the input end of buck converter 182. The input end of buck converter 182 is connected to an output side of a DC-DC transformer 188.

The input side of DC-DC transformer 188 is connected to power supply 116 via a quadrature transistor arrangement 190. A controller (not shown) is operable with transistor arrangement 190 to control the duty cycle of buck converter 182 and provide transient current management according to the present disclosure as previously described. This controller controls the duty cycle of buck converter 182 in the same manner as the control of the duty cycle of buck converter 112 described herein.

Although buck converters have been described herein, other embodiments of the present invention may employ the use of other converter topologies such as full bridge, half bridge, or boost.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a power converter; and
    a controller configured to enable the converter to supply current greater than a threshold during a first time period and, upon expiry of the first time period, to operate the converter to supply current with the current supplied from the converter being limited from exceeding the threshold during a longer duration second time period, the threshold being independent of the current supplied from the converter.

2. The vehicle of claim 1 wherein the power converter comprises a DC-DC buck converter.

3. The vehicle of claim 1 further comprising:
    an electric power assisted steering (EPAS) motor coupled to the power converter, wherein the first time period accommodates operation of the EPAS motor during a steering maneuver.

4. The vehicle of claim 1 further comprising:
    an antilock braking system (ABS) coupled to the power converter, wherein the first time period accommodates operation of the ABS during a braking event.

5. The vehicle of claim 1 wherein the first and second time periods are based on thermal characteristics of the power converter.

6. The vehicle of claim 1 wherein the power converter includes at least one transistor and wherein the first and second time periods are based on temperature of the at least one transistor.

7. The vehicle of claim 1 wherein the second time period is about one-hundred times longer than the first time period.

8. The vehicle of claim 1 wherein:
    the controller is further configured to re-enable the converter to supply current greater than the threshold during another first time period after expiry of the second time period in response to a demand for the converter to supply current greater than the threshold.

9. The vehicle of claim 1 wherein:
    the threshold is a maximum continuous steady-state current threshold.

10. A method for controlling a vehicle having a battery-powered traction motor and a power converter coupled to the battery, comprising:
    in response to a demand for the converter to supply current greater than a threshold, enabling the converter to supply current greater than the threshold during a first time period;
    upon expiry of the first time period, operating the converter to supply current with the current supplied from the converter being limited from exceeding the threshold during a longer duration second time period; and
    wherein the threshold is independent of the current supplied from the converter.

11. The method of claim 10 wherein the converter includes at least one transistor and the first and second time periods are based on temperature of the at least one transistor.

12. The method of claim 11 wherein the temperature is estimated based on duration and level of current supplied by the power converter.

13. The method of claim 10 wherein the converter comprises a DC-DC buck converter.

14. The method of claim 10 wherein the second time period is on the order of one-hundred times longer than the first time period.

15. The method of claim 10 further comprising performing an antilock braking system (ABS) during the first time period.

16. The method of claim 10 further comprising performing an electrical power assisted steering (EPAS) maneuver during the first time period.

17. The method of claim 10 further comprising:
    re-enabling the converter to supply current greater than the threshold during another first time period after expiry of the second time period in response to a demand for the converter to supply current greater than the threshold.

18. The method of claim 10 wherein:
    the threshold is a maximum continuous steady-state current threshold.

19. A method for controlling a vehicle having a traction energy source and a power converter, comprising:
    in response to a demand for the converter to supply current greater than a threshold, enabling the converter to use energy from the energy source to supply current greater than the threshold during a first time period;
    upon expiry of the first time period, operating the converter to use energy from the energy source to supply current with the current supplied from the converter being limited from exceeding the threshold during a second time period longer in duration than the first time period; and
    wherein the threshold is independent of the current supplied from the converter.

20. The method of claim 19 further comprising:
re-enabling the converter to use energy from the energy source to supply current greater than the threshold during another first time period after expiry of the second time period in response to a demand for the converter to supply current greater than the threshold.

\* \* \* \* \*